US010235665B2

(12) United States Patent
Toma (10) Patent No.: US 10,235,665 B2
(45) Date of Patent: Mar. 19, 2019

(54) SALES DATA PROCESSING APPARATUS AND SALES DATA PROCESSING METHOD (71) Applicant: CASIO COMPUTER CO., LTD., Shibuya-ku, Tokyo (JP)

(72) Inventor: Kazuyoshi Toma, Tokorozawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 311 days.

(21) Appl. No.: 15/188,929

(22) Filed: Jun. 21, 2016

(65) Prior Publication Data
US 2017/0091739 A1    Mar. 30, 2017

(30) Foreign Application Priority Data

Sep. 24, 2015 (JP) .................................. 2015-186904

(51) Int. Cl.
*G06Q 20/20* (2012.01)
*G06F 3/041* (2006.01)
*G06Q 20/30* (2012.01)
*G06Q 20/40* (2012.01)

(52) U.S. Cl.
CPC .......... *G06Q 20/20* (2013.01); *G06F 3/0416* (2013.01); *G06Q 20/30* (2013.01); *G06Q 20/405* (2013.01)

(58) Field of Classification Search
CPC ................... H04N 1/00; H04N 1/0046; H04N 2201/0094; G06F 15/173; G06F 3/02
USPC .............. 705/7.29, 7.26, 32, 16, 18, 43, 73; 345/168; 358/1.15
See application file for complete search history.

(56) References Cited

U.S. PATENT DOCUMENTS

| 6,968,321 B1* | 11/2005 | Yu ...................... G06Q 20/108 379/27.04 |
| 7,614,008 B2 | 11/2009 | Ording |
| 9,239,677 B2 | 1/2016 | Ording |
| 2002/0026428 A1* | 2/2002 | Ishikawa ................ G06Q 20/20 705/73 |
| 2006/0053387 A1 | 3/2006 | Ording |
| 2007/0174788 A1 | 7/2007 | Ording |
| 2008/0065396 A1* | 3/2008 | Marshall ................ G06Q 10/10 705/16 |
| 2010/0235732 A1* | 9/2010 | Bergman .............. G06F 3/0488 715/702 |
| 2010/0312606 A1* | 12/2010 | Gala ...................... G06Q 10/06 705/7.26 |
| 2011/0095986 A1* | 4/2011 | Aono .................... G06F 3/0233 345/168 |

(Continued)

FOREIGN PATENT DOCUMENTS

| EP | 2190172 A1 | 5/2010 |
| EP | 2869177 A1 | 5/2015 |

(Continued)

OTHER PUBLICATIONS

Japanese Office Action dated Oct. 3, 2017 issued in counterpart Japanese Application No. 2015-186904.

(Continued)

*Primary Examiner* — Olusegun Goyea
(74) *Attorney, Agent, or Firm* — Holtz, Holtz & Volek PC (57) ABSTRACT A sales data processing apparatus includes the following. An operation unit receives operation by touch by an operator. A setting unit sets contents of operation corresponding to how the operation unit is touched associated with each operator. A controller performs, for each operator, contents of operation set by the setting unit associated with how the operation unit is touched in response to the operator touching the operation unit.

16 Claims, 4 Drawing Sheets (56) References Cited

U.S. PATENT DOCUMENTS

| | | | | |
|---|---|---|---|---|
| 2013/0061733 | A1* | 3/2013 | Ohnishi | G10C 3/06 84/174 |
| 2013/0110581 | A1* | 5/2013 | Fanaru | G06F 11/3438 705/7.29 |
| 2013/0110868 | A1* | 5/2013 | Hatakeda | G06Q 30/02 707/769 |
| 2014/0354550 | A1* | 12/2014 | Mendonca | G06F 3/02 345/168 |
| 2014/0364987 | A1* | 12/2014 | Shikano | G06Q 10/06 700/111 |
| 2015/0006385 | A1 | 1/2015 | Shah | |
| 2015/0022469 | A1* | 1/2015 | Mhun | G06F 3/0416 345/173 |
| 2015/0070726 | A1* | 3/2015 | Umezawa | H04N 1/00416 358/1.15 |
| 2015/0123916 | A1 | 5/2015 | Inomata | |
| 2016/0117084 | A1 | 4/2016 | Ording | |

FOREIGN PATENT DOCUMENTS

| | | |
|---|---|---|
| JP | 2000231670 A | 8/2000 |
| JP | 2004362429 A | 12/2004 |
| JP | 2009509236 A | 3/2009 |
| JP | 4517931 B2 | 8/2010 |
| JP | 2015045930 A | 3/2015 |
| JP | 2015125480 A | 7/2015 |
| JP | 2015153373 A * | 8/2015 |
| JP | 2015153373 A | 8/2015 |

OTHER PUBLICATIONS

Extended European Search Report (EESR) dated Feb. 15, 2017, issued in counterpart European Application No. 16176240.6.
Extended European Search Report (EESR) dated Feb. 15, 2017, issued in counterpart European Application No. 1617240.6.

* cited by examiner

OPERATOR SETTING TABLE 3a

| OPERATOR CODE | OPERATOR NAME | GROUP CODE |
|---|---|---|
| 000011 | A | 0001 |
| 000113 | B | 0002 |
| 009001 | C | 1000 |
| 000301 | D | 0003 |
| 000114 | E | 0002 |
| 000310 | F | 0003 |
| 000012 | G | 0001 |
| 000122 | H | 0002 |
| 000123 | I | 0002 |
| 010001 | Z | 9000 |
| ⋮ | ⋮ | ⋮ |

FIG.2B

GROUP SETTING TABLE 3b

| GROUP CODE | GROUP NAME | FAST OPERATION | | NORMAL OPERATION CONTENTS | LONG PRESS OPERATION CONTENTS | MERCHANDISE SALES CALCULATION |
|---|---|---|---|---|---|---|
| | | SETTING | OPERATION CONTENTS | | | |
| 0001 | GENERAL EMPLOYEE | YES | MERCHANDISE REGISTRATION | — | — | — |
| 0002 | PART-TIMER | YES | MERCHANDISE REGISTRATION | — | — | — |
| 1000 | STORE MANAGER | NO | — | MERCHANDISE REGISTRATION | SETTING RELATED | NOT DO |
| 0003 | MANAGER | NO | — | MERCHANDISE REGISTRATION | REGISTRATION RELATED | DO |
| 9000 | MAINTENANCE | NO | — | MERCHANDISE REGISTRATION | SETTING RELATED | NOT DO |
| ⋮ | ⋮ | ⋮ | ⋮ | ⋮ | ⋮ | ⋮ |

SALES DATA PROCESSING APPARATUS AND SALES DATA PROCESSING METHOD

BACKGROUND OF THE INVENTION

1. Field of the Invention

The present invention relates to a sales data processing apparatus and a sales data processing method.

2. Background Art

Conventionally, a sales data processing apparatus such as an ECR (Electronic Cash Register) which performs sales registration of merchandise is known (for example, Japanese Patent No. 4517931, Japanese Patent Application Laid-Open Publication No. 2015-153373). For example, such sales data processing apparatus may include a touch panel which can be operated by the operator by touching. The touch panel can output an instruction signal so that the sales data processing apparatus performs different operation according to how the operator touches the touch panel, that is, the length of time the operator touches the touch panel. The touch panel may output an instruction signal so that the sales data processing apparatus performs a predetermined operation as soon as the operator touches the touch panel.

Many people such as part-timers, general employees, a store manager, etc. operate the sales data processing apparatus and the operation as the main job is different depending on the position. For example, part-timers, general employees, etc. mainly register merchandise ordered at the store whereas in addition to registering merchandise, the store manager also sets the unit price of the merchandise.

Here, when the operator is the part-timer or general employee, it is preferable that the merchandise is registered as soon as the operator touches the touch panel to put priority on speed and efficiency timewise. Turning to the store manager, since the store manager hardly serves the customer of the store, speed and efficiency timewise in registering the merchandise is not necessary. Rather, it is preferable that different operation can be performed according to the length of time that the store manager touches the touch panel.

However, it is difficult to allow both of the following, that is, the corresponding predetermined operation being performed as soon as the operator touches the touch panel and different operation being performed according to the length of time that the touch panel is touched.

SUMMARY OF THE INVENTION

The present invention is made in view of the above problems, and the purpose of the present invention is to enable different operation for each operator depending on how each operator touches an operation unit.

According to an aspect of the present invention, there is provided a sales data processing apparatus including: an operation unit which receives operation by touch by an operator; a setting unit which sets contents of operation corresponding to how the operation unit is touched associated with each operator; and a controller which performs, for each operator, contents of operation set by the setting unit associated with how the operation unit is touched in response to the operator touching the operation unit.

According to an aspect of the present invention, there is provided a sales data processing method including: setting contents of operation corresponding to how an operation unit which receives operation by touch by an operator is touched associated with each operator; and controlling to perform, for each operator, contents of operation set by the setting unit associated with how the operation unit is touched in response to the operator touching the operation unit.

According to the present invention, different operation can be performed depending on how each operator touches an operation unit.

DETAILED DESCRIPTION OF THE PREFERRED OPERATION

A detailed embodiment of the present invention is described with reference to the drawings. The scope of the invention is not limited to the illustrated examples.

For example, a sales data processing apparatus 100 is an ECR provided in a private store, retail store, restaurant, etc. The sales data processing apparatus 100 performs processes such as registering sales data of merchandise, setting a unit price of merchandise, etc. according to operation by the operator such as an employee.

First, the configuration of the sales data processing apparatus 100 is described.

Figure 1:
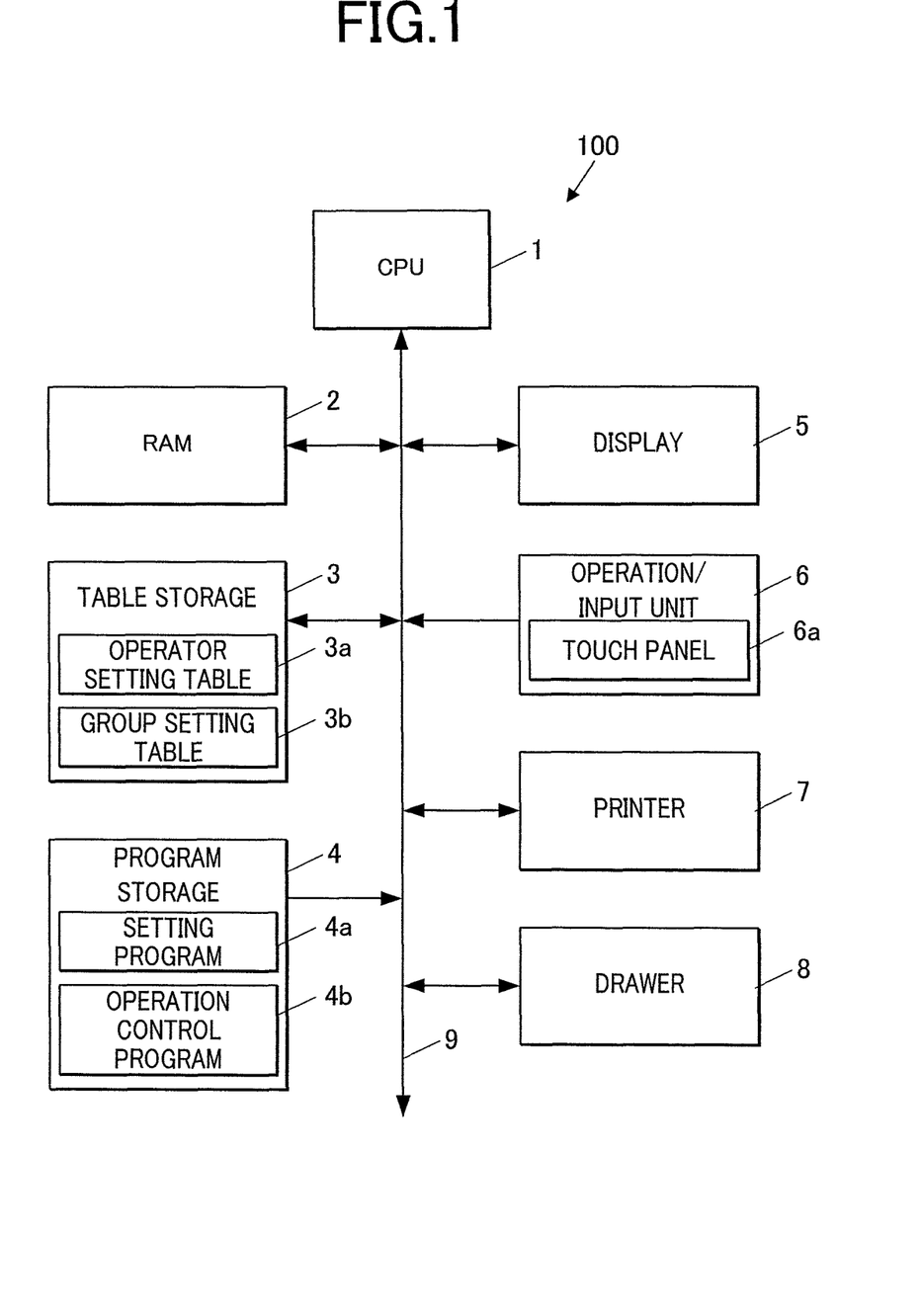
FIG. 1 is a block diagram showing a functional configuration of a sales data processing apparatus according to an embodiment of the present invention.

FIG. 1 is a block diagram showing a functional configuration of the sales data processing apparatus 100.

As shown in FIG. 1, the sales data processing apparatus 100 of the present embodiment includes a CPU 1, a RAM 2, a table storage 3, a program storage 4, a display 5, an operation/input unit 6, a printer 7, and a drawer 8. Each unit of the sales data processing apparatus 100 is connected to each other through a bus 9.

The CPU (Central Processing Unit) 1 controls each unit of the sales data processing apparatus 100. The CPU 1 reads a specified program from a system program and application programs stored in the program storage 4, develops the program in a work area of the RAM 2, and performs various processing according to the program. Here, the CPU 1 stores various processing results in the RAM 2 and displays the result on the display 5 according to necessity.

The RAM (Random Access Memory) 2 is, for example, a volatile memory and includes a work area in which various programs and pieces of data read from the CPU 1 are temporarily stored.

The table storage 3 is storage which is able to read and write information, and examples include a flash memory, EEPROM (Electrically Erasable Programmable Read Only Memory), etc. The table storage 3 stores an operator setting table 3a and a group setting table 3b (see FIG. 2A and FIG. 2B).

Figure 2A:
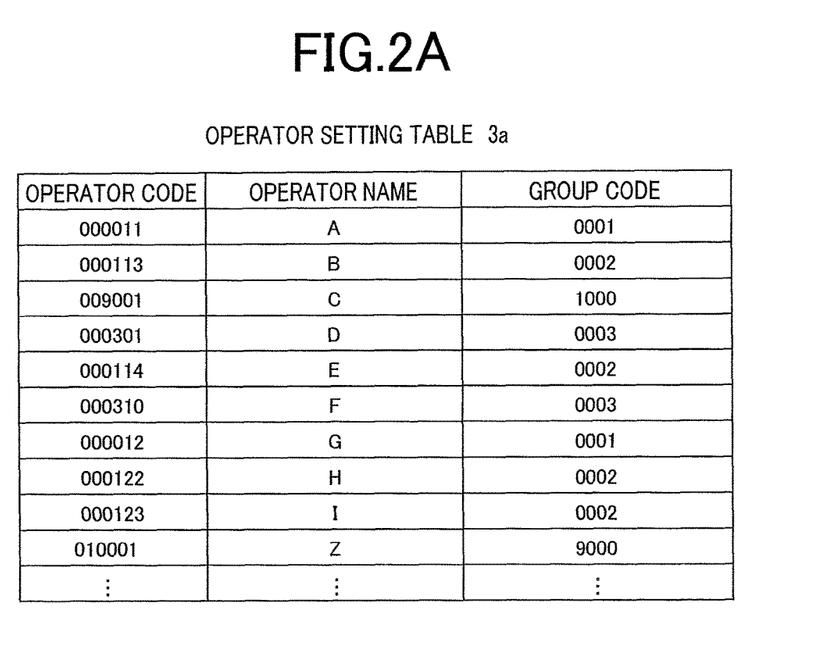
FIG. 2A is a diagram showing an example of an operator setting table recorded in the sales data processing apparatus shown in FIG. 1.

FIG. 2A is a diagram showing an example of an operator setting table 3a.

The operator setting table 3a is a table regarding setting of an operator group to which each operator belongs. Specifically, as shown in FIG. 2A, an "operator code" to identify each operator, an "operator name" which is the name of the operator, and a "group code" to identify each operator group are stored in the operator setting table 3a associated with each other.

For example, "000011" as the "operator code", "A" as the "operator name", and "0001" as the "group code" are associated with each other.

Similarly, "000113" as the "operator code", "B" as the "operator name", and "0002" as the "group code" are associated with each other.

Similarly, "009001" as the "operator code", "C" as the "operator name", and "1000" as the "group code" are associated with each other.

Similarly, "000301" as the "operator code", "D" as the "operator name", and "0003" as the "group code" are associated with each other.

Similarly, "000114" as the "operator code", "E" as the "operator name", and "0002" as the "group code" are associated with each other.

Similarly, "000310" as the "operator code", "F" as the "operator name", and "0003" as the "group code" are associated with each other.

Similarly, "000012" as the "operator code", "G" as the "operator name", and "0001" as the "group code" are associated with each other.

Similarly, "000122" as the "operator code", "H" as the "operator name", and "0002" as the "group code" are associated with each other.

Similarly, "000123" as the "operator code", "I" as the "operator name", and "0002" as the "group code" are associated with each other.

Similarly, "010001" as the "operator code", "Z" as the "operator name", and "9000" as the "group code" are associated with each other.

The contents of the above operator setting table 3a is one example and the present invention is not limited to the above. Suitable modifications can be made without leaving the scope of the invention.

Figure 2B:
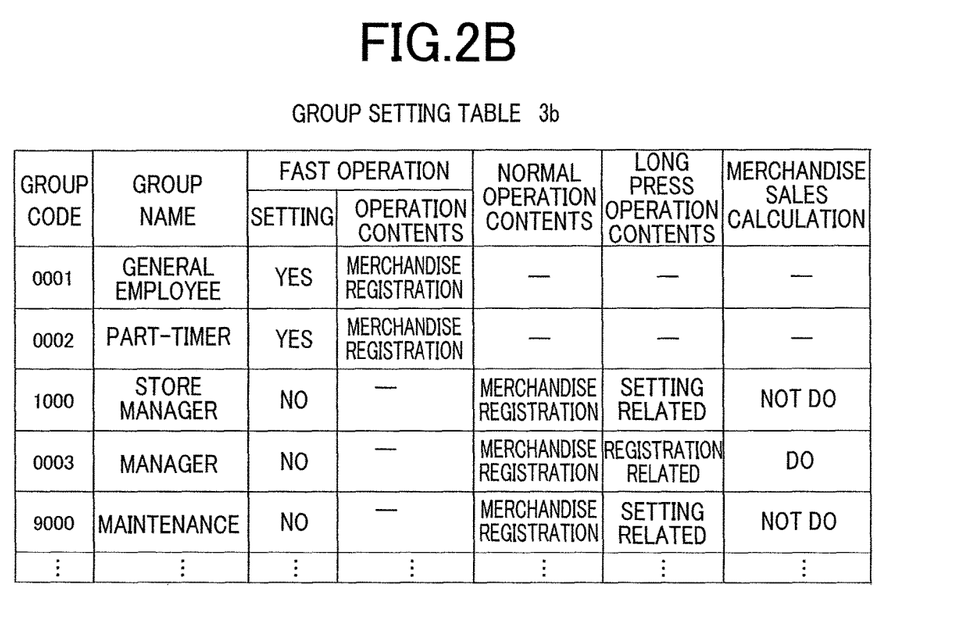
FIG. 2B is a diagram showing an example of a group setting table recorded in the sales data processing apparatus shown in FIG. 1.

FIG. 2B is a diagram showing an example of a group setting table 3b.

The group setting table 3b is a table regarding various setting of each operator group.

Specifically, as shown in FIG. 2B, a "group code" to identify each operator group, a "group name" which is the name of the operator group, a "fast operation" regarding setting of predetermined operation performed as soon as the touch panel 6a is touched, "normal operation contents" showing operation contents corresponding to "normal operation" of the touch panel 6a, "long press operation contents" showing operation contents corresponding to "long press operation" of the touch panel 6a, "merchandise sales calculation" regarding setting of whether to calculate sales when registering the merchandise are stored in the group setting table 3b associated with each other.

Here, "fast operation" is to perform corresponding predetermined operation (for example, merchandise registration) as soon as the touch panel 6a is touched, and is swiftly performed regardless of releasing touching of the touch panel 6a, in other words, regardless of movement of separating the finger from the touch panel 6a. Moreover, "setting" showing whether to perform "fast operation" is set and "operation contents" showing the contents of the predetermined operation are associated with each other.

The "normal operation" and "long press operation" of the touch panel 6a are divided according to the length of time (touching time) the operator touches the touch panel 6a. Operation of touching less than a predetermined length of time (for example, about 1 second) is considered to be "normal operation", and touching operation for a predetermined length of time or more is to be "long press operation". The "normal operation contents" and "long press operation contents" are set only in operation groups where setting shows that "fast operation" is not performed (column of "setting" is "no").

Whether to calculate sales when registering the merchandise means whether to record sales data when the merchandise is registered in the merchandise registration operation. In other words, for example, the main job is different depending on the position such as "general employee", "part-timer", "store manager", "manager", "maintenance", etc. Therefore, as for the "general employee" or "part-timer" who mainly serves customers, the sales is usually calculated when the merchandise is registered. As for the "store manager" or "maintenance" who have jobs other than serving customers, there is a mode for practicing sales registration, and there may be setting not to calculate sales when the merchandise is registered.

Specifically, as shown in FIG. 2B, for example, "0001" as the "group code"; "general employee" as the "group name"; and "yes" showing there is "setting" to perform "fast operation" and "merchandise registration" showing merchandise registration as the "operation contents" are associated with each other. Similarly, "0002" as the "group code"; "part-timer" as the "group name"; and "yes" showing there is "setting" to perform "fast operation" and "merchandise registration" showing merchandise registration as the "operation contents" are associated with each other.

Moreover, "1000" as the "group code"; "store manager" as the "group name"; "no" showing the "setting" is to not perform "fast operation"; "merchandise registration" showing merchandise registration as "normal operation contents"; "setting related" showing setting related operation as "long press operation contents"; and "not do" showing sales are not calculated as "merchandise sales calculation" are associated with each other. Similarly, "0003" as the "group code"; "manager" as the "group name"; "no" showing the "setting" is to not perform "fast operation"; "merchandise registration" showing merchandise registration as "normal operation contents"; "registration related" showing registration related operation as "long press operation contents"; and "do" showing sales are calculated as "merchandise sales calculation" are associated with each other.

Similarly, "9000" as the "group code"; "maintenance" as the "group name"; "no" showing the "setting" is to not perform "fast operation"; "merchandise registration" showing merchandise registration as "normal operation contents"; "setting related" showing setting related operation as "long press operation contents"; and "not do" showing sales are not calculated as "merchandise sales calculation" are associated with each other.

In the merchandise registration, the ordered merchandise is registered, and other than the merchandise registration practice mode, the sales of the registered merchandise is calculated and recorded as sales data. Setting related operation is operation related to setting of the merchandise such as setting the unit price or the category of the merchandise.

Registration related operation is operation secondarily performed related to merchandise registration such as registration of discount of merchandise.

The contents of the group setting table 3b are merely examples, and the present invention is not limited to the above. Suitable modifications can be made. For example, the operation performed by the sales data processing apparatus 100 can be operation other than merchandise registration, setting related operation and registration related operation.

The program storage 4 is a storage dedicated to reading information, and includes, for example, a ROM (Read Only Memory), etc. The program storage 4 stores a setting program 4a and operation control program 4b.

The setting program 4a is a program to realize the function of the setting process regarding setting to associate contents of operation corresponding to how the touch panel 6a is touched by each operator.

The setting process is the process to register various information in the operator setting table 3a and the group setting table 3b and to edit the registered contents.

Specifically, the CPU 1 reads the setting program 4a from the program storage 4, and performs at least one process specified by the user from the operator setting process and the group setting process according to the setting program 4a. Here, the CPU 1 functions as the setting unit in coordination with the setting program 4a.

For example, the operator setting process is a process performed when an operator needs to be added to or deleted from the operator setting table 3a due to transfer of the operator, etc.

According to the operator setting process, the CPU 1 performs setting to associate the operator group to each operator according to a predetermined condition. In other words, as shown in the group setting table 3b (see FIG. 2B), the operator group is divided by authority according to position such as "general employee", "part-timer", "store manager", "manager", "maintenance", etc.

For example, when a new operator is added to the operator setting table 3a, the "operator code" (for example, "000011", etc.) of the new operator, the "operator name" which is the name of the new operator (for example, "A", etc.), and the "group code" of the operator group according to the position (for example, "0001" corresponding to "general employee", etc.) are input based on predetermined operation on the operation/input unit 6 by the user and registered in each column of the operator setting table 3a by the CPU 1.

For example, when an existing operator is deleted from the operator setting table 3a, based on predetermined operation of the operation/input unit 6 by the user, the CPU 1 deletes information in the "operator code", the "operator name", and the "group code" in each column for the operator to be deleted from the operator setting table 3a.

For example, the group setting process is a process performed when it is necessary to perform, for example, new registration (add) of an operator group in the group setting table 3b or to change (including delete) the setting information relating to the operator group registered in the group setting table 3b.

For example, in the group setting process, when the new operator group is added in the group setting table 3b based on the predetermined operation on the operation/input unit 6 by the user, the CPU 1 sets "fast operation", "normal operation contents", "long press operation contents", and "merchandise sales calculation" and registers the above in each column of the group setting table 3b for each operator group such as "general employee", "part-timer", "store manager", "manager", "maintenance", etc.

That is, the CPU 1 sets for each operator group whether the corresponding predetermined operation (for example, merchandise registration, etc.) is performed as soon as the touch panel 6a is touched.

For the operation group in which there is "setting" to perform the "fast operation" (for example, "general employee" and "part-timer", etc.), the CPU 1 sets the operation content corresponding to touching the touch panel 6a.

For the operation group in which there is "setting" not to perform the "fast operation" (for example, "store manager", "manager", and "maintenance", etc.), the CPU 1 sets contents (for example, merchandise registration) corresponding to touching the touch panel 6a less than a predetermined length of time ("normal operation") and contents (for example, setting related operation, registration relating operation, etc.) corresponding to continuously touching the touch panel 6a for a predetermined length of time or more ("long press operation").

The CPU 1 sets whether the sales data is recorded when the merchandise is registered in the merchandise registration operation for each operator.

For example, when the setting information of the registered operator group is changed in the group setting table 3b, based on the predetermined operation of the operation/input unit 6 by the user, the CPU 1 specifies the column of the setting information to be changed from the columns such as "fast operation", "normal operation contents", "long press operation contents", and "merchandise sales calculation" of the operator group to be changed in the group setting table 3b, and changes the contents.

The operation control program 4b is a program which realizes the function regarding the operation control process to perform the operation of the contents set in the setting process corresponded with the way the touch panel 6a is touched for each operator operating the sales data processing apparatus 100.

Specifically, the CPU 1 reads the operation control program 4b from the program storage 4 and performs the operation control process according to the operation control program 4b. Here, the CPU 1 functions as the controller in coordination with the operation control program 4b.

In the operation control process, for example, the CPU 1 performs the operation of the contents set in the setting process corresponded with the way the operator touches the touch panel 6a for each operator group belonging to the operator who signed on to the sales data processing apparatus 100.

Figure 3:
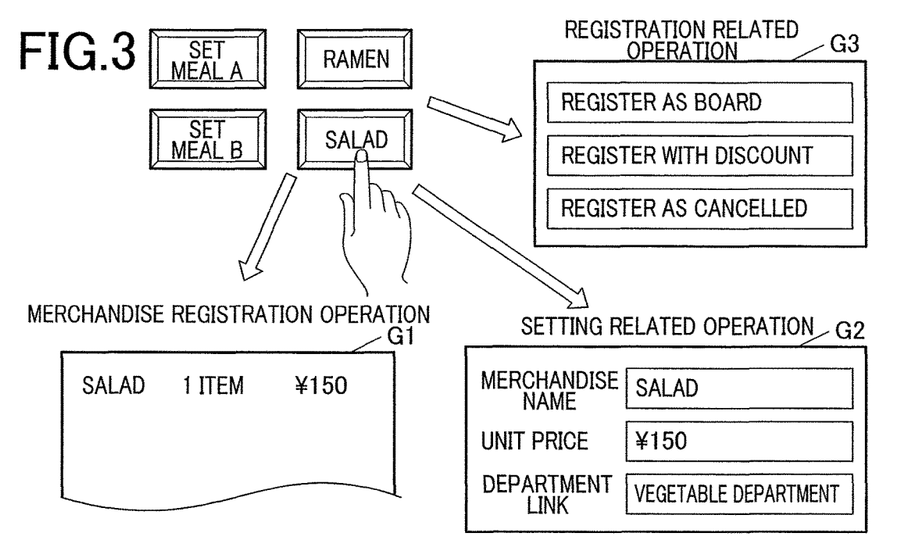
FIG. 3 is a diagram schematically showing an example of operation by the sales data processing apparatus shown in FIG. 1.

Here, the operation performed in response to touching the touch panel 6a is described with reference to FIG. 3.

For example, as for the operator group with "setting" to perform the "fast operation" which performs corresponding predetermined operation as soon as the touch panel 6a is touched (for example, "general employee", "part-timer", etc.), the touch panel 6a outputs to the CPU 1 a position signal showing the touched position when the operator belonging to this operator group touches the key displaying the merchandise name of the merchandise (for example, "salad", etc.) displayed on the display 5.

When the position signal is input, the CPU 1 immediately performs the merchandise registration operation to register the merchandise corresponding to the position signal and displays the merchandise registration screen G1 (see FIG. 3) showing the merchandise name, number of purchases, unit price, etc. on the display 5.

For example, as for the operator group (for example, "store manager", "manager", "maintenance", etc.) without the "setting" to perform the "fast operation" which performs corresponding predetermined operation as soon as the touch panel 6a is touched, the touch panel 6a outputs to the CPU 1 a position signal showing the touched position when the operator belonging to this operator group touches the key displaying the merchandise name of the merchandise (for example, "salad", etc.) displayed on the display 5.

The output of the position signal is performed continuously at a predetermined interval as long as the touch panel 6a is touched. The CPU 1 calculates the length of time that the position signal is input. When the measured time (touched time) is less than a predetermined length of time, the merchandise registration operation set in the "normal operation contents" in the group setting table 3b is performed, and similar to the above, the merchandise registration screen G1 showing the merchandise name, number of purchases, unit price, etc. is displayed on the display 5.

When the measured time (touched time) is equal to or more than a predetermined length of time, according to the operator group, the CPU 1 performs the operation set in the "long press contents" in the group setting table 3b. For example, when the operator group is "store manager" or "maintenance", the CPU 1 performs the setting related operation of the merchandise corresponding to the position signal and displays the setting related screen G2 (see FIG. 3) showing the setting of the unit price and the category of the merchandise on the display 5.

When the operator group is "manager", the CPU 1 performs the registration related operation for the merchandise corresponding to the position signal, and displays the registration related screen G3 (see FIG. 3) showing the registration, etc. of discount on the display 5.

For example, the display 5 includes a display such as LCD (Liquid Crystal Display), organic EL (Electro-Luminescence) display, etc. The display 5 displays various screens according to an instruction of the input display signal output from the CPU 1.

The operation/input unit 6 is used for predetermined operation of the sales data processing apparatus 100.

The operation/input unit 6 includes the touch panel (operation unit) 6a which is touched by the operator who operates the sales data processing apparatus 100.

The touch panel 6a is formed as one with the display 5, and for example, the XY coordinate of the position touched by the operator is detected on the display 5 by various methods such as capacitance method, resistance film method, and ultrasound surface elastic wave method. The touch panel 6a outputs to the CPU 1 the position signal regarding the XY coordinate of the touched position.

The output of the position signal from the touch panel 6a continues at a predetermined interval as long as the operator touches the touch panel 6a, that is, until the touching is released.

For example, the printer 7 includes a thermal printer and prints out a price or sales data on a rolled sheet of thermal paper for a receipt or for a journal according to an input instruction signal output from the CPU 1.

The drawer 8 includes a drawer storing cash such as coins and bills, and opens the drawer according to an input instruction signal output from the CPU 1. The opened drawer can be closed manually by the operator.

<Setting Reading Process>

Next, the setting reading process by the sales data processing apparatus 100 is described with reference to FIG. 4.

Figure 4:
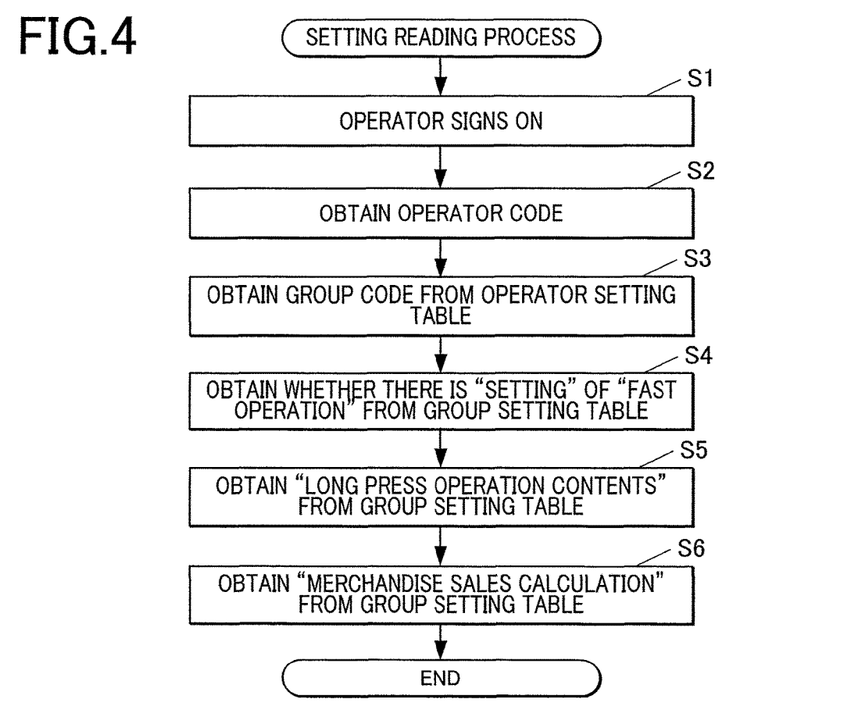
FIG. 4 is a flowchart showing an example of operation regarding a setting reading process by the sales data processing apparatus shown in FIG. 1.

FIG. 4 is a flowchart showing an example of operation regarding the setting reading process.

In the setting reading process described below, the setting process (operator setting process, group setting process) is performed in advance.

That is, the "operator code", the "operator name", and the "group code" are associated to each other for each operator and registered in the operator setting table 3a. The "group code", the "group name", the "fast operation", the "normal operation contents", the "long press contents", and the "merchandise sales calculation" are associated to each other for each operator group and registered in the group setting table 3b.

For example, as shown in FIG. 4, the CPU 1 displays the operator key for each operator on the display 5. When an operator signs on by touching his operator key (step S1), the CPU 1 obtains the "operator code" of the operator associated with the touched operator key (step S2).

Next, the CPU 1 reads the operator setting table 3a from the table storage 3 and obtains the "group code" registered in the operator setting table 3a associated with the obtained "operator code" (step S3).

Next, the CPU 1 reads the group setting table 3b from the table storage 3, obtains whether there is "setting" of "fast operation" registered in the group setting table 3b associated with the obtained "group code", and stores the "setting" in the RAM 2 (step S4). Next, the CPU 1 obtains the "long press contents" registered in the group setting table 3b associated with the obtained "group code" and stores the "long press contents" in the RAM 2 (step S5).

Further, the CPU 1 obtains the contents of the "merchandise sales calculation" registered in the group setting table 3b associated with the obtained "group code" and stores the contents in the RAM 2 (step S6).

With this, the setting reading process ends.

In the setting reading process, as for the operator groups in which there is no "setting" to perform the "fast operation" in the group setting table 3b shown in FIG. 2B (for example, "store manager", "manager", "maintenance", etc.), merchandise registration operation is set as the "normal operation contents", and therefore, the "normal operation contents" is not obtained. However, this is merely one example, and for example, when the "normal operation contents" is different depending on the operator group, the "normal operation contents" is obtained.

<Operation Control Process>

Next, the operation control process by the sales data processing apparatus 100 is described with reference to FIG. 5.

Figure 5:
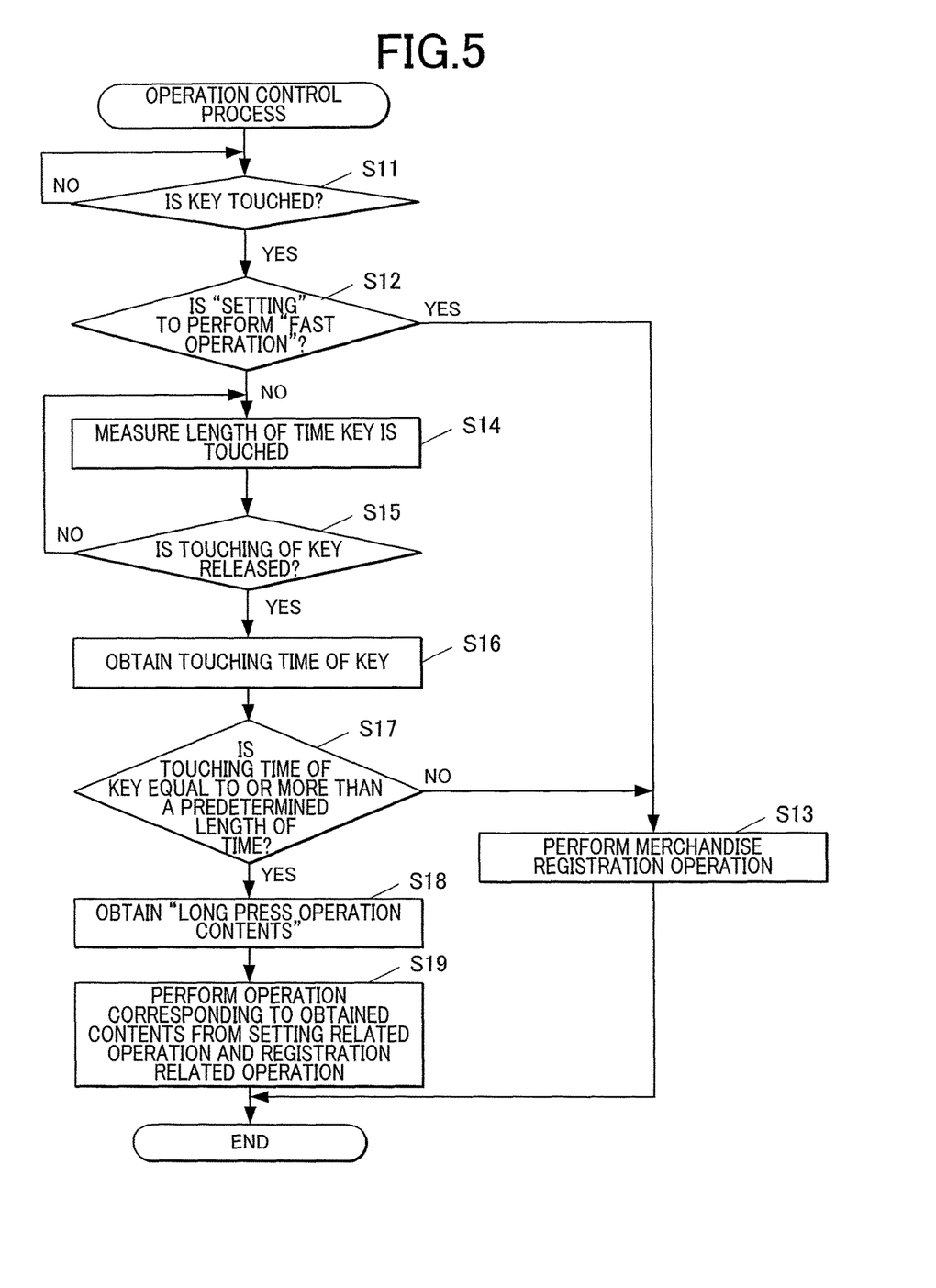
FIG. 5 is a flowchart showing an example of operation regarding an operation control process by the sales data processing apparatus shown in FIG. 1.

FIG. 5 is a flowchart showing an example of operation of the operation control process.

The operation control process described below is a process performed after reading with the setting reading process the various types of information regarding the operator who signed on. The display 5 displays the merchandise name of the various types of merchandise.

First, according to whether there is a signal from the touch panel 6a, the CPU 1 determines whether the key displaying the merchandise name corresponding to the merchandise (for example, "salad", etc.) displayed on the display 5 is touched by the operator (step S11).

That is, when the key displaying the merchandise name is touched, the touch panel 6a outputs to the CPU 1 a position signal of the touched position, and based on the input of the position signal output from the touch panel 6a, the CPU 1 determines the key is touched.

Here, when it is determined that the key is not touched (step S11; NO), the CPU 1 repeats judgement of whether the key is touched at a predetermined interval of time.

In step S11, when it is determined that the key is touched (step S11; YES), the CPU 1 reads the operation control program 4b from the program storage 4, and determines whether there is "setting" to perform "fast operation" for the operator whose information is read in the setting reading process according to the operation control program 4b (step S12).

In step S12, when it is determined that there is "setting" to perform "fast operation" ("setting" is "yes") (step S12; YES), the merchandise registration operation in which the merchandise corresponding to the position touched on the touch panel 6a is registered is immediately performed and the merchandise registration screen G1 (see FIG. 3) is displayed on the display 5 (step S13). That is, when the operator group to which the signed on operator belongs is "general employee", "part-timer", etc., there is "setting" to perform "fast operation". Therefore, in this case, the CPU 1 performs the merchandise registration operation.

When it is determined that there is no "setting" to perform the "fast operation" ("setting" is "no") (step S12; NO), the CPU 1 measures the time the operator continuously touches the key (step S14). Specifically, for example, the CPU 1 measures the time the position signal continuously output due to touching the touch panel 6a is input.

Next, the CPU 1 determines whether the operator released touching the key according to whether there is a signal from the touch panel 6a (step S15).

In step S15, when it is determined that the touching of the key is not released (step S15; NO), the CPU 1 returns the process to step S14, measures the time that the key is continuously touched, and repeats the judgments of whether the operator released touching the key at a predetermined interval of time.

When it is determined that touching the key is released (step S15; YES), the CPU 1 obtains the length of time (key touching time) that the key is continuously touched (step S16), and determines whether the obtained length of time that the key is touched is a predetermined length of time or more (step S17).

In step S17, when it is determined that the length of time that the key is touched is not equal to or more than (is less than) a predetermined length of time (step S17; NO), the CPU 1 advances the process to step S13, performs the merchandise registration operation to register the merchandise corresponding to the position touched on the touch panel 6a, and the merchandise registration screen G1 is displayed on the display 5 (step S13). That is, when the operator group to which the signed on operator belongs is the "store manager", the "manager", or the "maintenance", etc., the CPU 1 performs merchandise registration operation as "normal operation contents".

Here, as for the operator whose information is read in the setting reading process, the CPU 1 obtains the "merchandise sales calculation", and when there is setting to not calculate the sales ("not do"), the process progresses to the practice mode of the merchandise registration.

In step S17, when it is determined that the length of time that the key is touched is a predetermined length of time or more (step S17; YES), the CPU 1 obtains the "long press contents" for the operator whose information is read in the setting reading process (step S18).

Then, the CPU 1 performs the operation to set the obtained "long press contents" among the setting related operation and the registration related operation of the merchandise corresponding to the position touched on the touch panel 6a (step S19).

That is, when the operator group to which the signed on operator belongs is "store manager", "maintenance", etc., the CPU 1 operates the setting related operation as the "long press operation" and displays the setting related screen G2 (see FIG. 3) on the display 5.

When the operator group to which the signed on operator belongs is "manager", etc., the CPU 1 performs the registration related operation as the "long press operation" and displays the registration related screen G3 (see FIG. 3) on the display 5. With this, the operation control process ends.

As described above, according to the sales data processing apparatus 100 of the present embodiment, the contents of operation corresponding to how the touch panel 6a is touched is set associated for each operator. With this, the contents of operation set corresponding to how the touch panel 6a is touched can be performed for each operator who operates the sales data processing apparatus 100 in response to the operator touching the touch panel 6a.

Since it is possible to set for each operator whether to perform a corresponding predetermined operation as soon as the touch panel 6a is touched, the merchandise registration operation to register the ordered merchandise can be immediately performed in response to touching the touch panel 6a for the operator (for example, operator belonging to the operator group such as "general employee", "part-timer", etc.) whose setting shows to perform the corresponding predetermined operation as soon as the touch panel 6a is touched.

As for the operator (operator belonging to the operator group such as, "store manager", "manager", "maintenance", etc.) whose setting shows not to perform the corresponding predetermined operation as soon as the touch panel 6a is touched, different operation can be performed depending on the length of time that the touch panel 6a is touched.

For example, when the touch panel 6a is touched less than a predetermined length of time, the merchandise registration operation to register the ordered merchandise can be performed, whereas when the touch panel 6a is touched a predetermined length of time or more, the registration related operation relating to the registration of the ordered merchandise or the setting related operation related to setting the merchandise can be performed.

As described above, it is possible to maintain the configuration to perform corresponding predetermined operation as soon as the operator touches the touch panel 6a and the configuration to be able to perform different operation according to the length of time that the touch panel 6a is touched. Therefore, the operation can be set for each operator to perform different operation depending on how the operator touches the touch panel 6a.

The contents of operation corresponding to how the touch panel 6a is touched are set associated with each operation group to which the operator belongs. Therefore, even if the operator is added or deleted, there is no need to perform troublesome setting for each operator.

That is, the added operator is associated to one of the operator groups. As for the deleted operator, the relation between the operator group to which the operator belongs is deleted. Therefore, it is possible to provide a sales data processing apparatus 100 which is easy to use.

Whether the sales data is recorded when the merchandise is registered in the merchandise registration operation is set for each operator. Therefore, it is possible to set whether to record the sales data considering the main job of each operator. With this, it is possible to provide a sales data processing apparatus 100 which is easy to use.

The present invention is not limited to the above embodiment, and various modifications and changes in design can be made without leaving the scope of the present invention.

For example, according to the present embodiment, the contents of the operation associated with how the touch panel 6a is touched are set associated with each operator group. However, this is merely one example, and the present invention is not limited to the above. For example, the contents can be set associated with each operator.

According to the above embodiment, whether the sales data is recorded when the merchandise is registered in the merchandise registration operation is set for each operator, however this is merely one example, and the present invention is not limited to the above. Such setting does not have to be made.

When the sales data is not recorded, the mode is switched to a practice mode. Such practice mode can be set for operation other than the merchandise registration operation such as the setting related operation and the registration related operation.

Regarding how the touch panel 6a is touched, the above example shows the length of time that the operator touches the touch panel 6a is different. This is merely one example, and the present invention is not limited to the above. Suitable change can be made.

That is, the contents of the operation can be differed according to how the touch panel 6a is touched other than the length of time (for example, the number of positions touched at the same time, pressure, etc.).

In addition, the touch panel 6a is shown as an example of the operation unit, but this is merely one example and the present invention is not limited to the above. For example, suitable modification is possible such as using a mechanical key or button which can be pressed.

The configuration of the sales data processing apparatus 100 is merely one example, and is not limited to the above.

For example, the following functions such as the setting unit which sets the contents of operation corresponding to how the touch panel 6a is touched associated with each operator, and the controller which performs the contents of the operation set by the setting unit associated with how the touch panel 6a is touched for each operator operating (signed on) the sales data processing apparatus 100 are realized by the CPU 1 performing a predetermined program, but the present invention is not limited to the above. For example, the functions of the setting unit and the controller can be configured from a predetermined logic circuit (both not shown).

In addition to the ROM and the hard disk, nonvolatile memory such as a flash memory or a portable recording medium such as a CD-ROM can be applied as the computer-readable storage medium storing the program to perform each process. As the medium providing the data of the program through predetermined communication lines, a carrier wave can be applied.

This application is based upon and claims the benefit of priority from the prior Japanese Patent Application No. 2015-186904, filed Sep. 24, 2015, the entire contents of which are incorporated herein by reference.

What is claimed is:

1. A sales data processing apparatus comprising:
an operation input device;
a first database which stores a group attribute in association with each of a plurality of operators;
a second database which stores a plurality of the group attributes and setting contents in association with each of the plurality of group attributes; and
a processor which is configured to:
obtain, from the first database, the group attribute associated with an operator of the operation input device;
obtain, from the second database, the setting contents associated with the group attribute obtained from the first database; and
perform control of a response by the sales data processing apparatus to an input to the operation input device, such that the response corresponds to the operator, in accordance with the setting contents obtained from the second database;
wherein the setting contents include:
a setting indicating whether or not to determine a time length of the input to the operation input device;
information indicating a first operation to be performed when the setting indicates not to determine the time length of the input to the operation input device; and
information indicating different second operations to be performed in response to different time lengths of the input to the operation device, when the setting indicates that the time length of the input to the operation input device is to be determined; and
wherein the control of the response comprises:
immediately performing the first operation in response to the input to the operation input device, when the setting indicates not to determine the time length of the input to the operation input device; and
performing one of the second operations based on the time length of the input to the operation input device, when the setting indicates that the time length of the input to the operation input device is to be determined.

2. The sales data processing apparatus according to claim 1, wherein the first operation is the same as one of the second operations.

3. The sales data processing apparatus according to claim 1, wherein the different second operations to be performed in response to different time lengths of the input to the operation device comprise one second operation to be performed when the time length is less than a threshold, and another second operation to be performed when the time length is not less than the threshold.

4. The sales data processing apparatus according to claim 3, wherein the first operation is the same as the one second operation to be performed when the time length is less than the threshold.

5. The sales data processing apparatus according to claim 1, wherein the operation input device includes input keys, the input to the operation input device is an input operation to one of the plurality of input keys, and the time length of the input to the operation input device is a time length of the input operation to the one of the plurality of input keys; and
wherein the different second operations to be performed in response to different time lengths of the input to the operation device comprise:
an operation to receive a registration of a merchandise item that has been made to correspond with the one of the plurality of input keys; and
an operation process to make a merchandise item correspond to the one of the plurality of input keys.

6. The sales data processing apparatus according to claim 5, wherein the setting contents indicate that the operation to receive the registration of a merchandise item is to be performed when the time length is less than a threshold, and that the operation to make a merchandise item correspond to the one of the plurality of input keys is to be performed when the time length is not less than the threshold.

7. The sales data processing apparatus according to claim 1, wherein the first database stores identification information for the plurality of operators and the group attribute in association with each of the plurality of operators;
   wherein the processor is further configured to obtain identification information corresponding the operator of the operation input device; and
   wherein the processor obtains the group attribute from the first database based on the obtained identification information.

8. The sales data processing apparatus according to claim 1, wherein the operation input device comprises a touch panel.

9. A sales data processing method for a sales data processing apparatus comprising an operation input device, the method comprising:
   obtaining, from a first database, a group attribute associated with an operator of the operation input device, the first database storing a group attribute in association with each of a plurality of operators;
   obtaining, from a second database, setting contents associated with the group attribute obtained from the first database, the second database storing a plurality of the group attributes and setting contents in association with each of the plurality of group attributes; and
   performing control of a response by the sales data processing apparatus to an input to the operation input device, such that the response corresponds to the operator, in accordance with the setting contents obtained from the second database;
   wherein the setting contents include:
      a setting indicating whether or not to determine a time length of the input to the operation input device;
      information indicating a first operation to be performed when the setting indicates not to determine the time length of the input to the operation input device; and
      information indicating different second operations to be performed in response to different time lengths of the input to the operation device, when the setting indicates that the time length of the input to the operation input device is to be determined; and
   wherein the control of the response comprises:
      immediately performing the first operation in response to the input to the operation input device, when the setting indicates not to determine the time length of the input to the operation input device; and
      performing one of the second operations based on the time length of the input to the operation input device, when the setting indicates that the time length of the input to the operation input device is to be determined.

10. The sales data processing method according to claim 9, wherein the first operation is the same as one of the second operations.

11. The sales data processing method according to claim 9, wherein the different second operations to be performed in response to different time lengths of the input to the operation device comprise one second operation to be performed when the time length is less than a threshold, and another second operation to be performed when the time length is not less than the threshold.

12. The sales data processing method according to claim 11, wherein the first operation is the same as the one second operation to be performed when the time length is less than the threshold.

13. The sales data processing method according to claim 9, wherein the operation input device includes input keys, the input to the operation input device is an input operation to one of the plurality of input keys, and the time length of the input to the operation input device is a time length of the input operation to the one of the plurality of input keys; and
   wherein the different second operations to be performed in response to different time lengths of the input to the operation device comprise:
      an operation to receive a registration of a merchandise item that has been made to correspond with the one of the plurality of input keys; and
      an operation process to make a merchandise item correspond to the one of the plurality of input keys.

14. The sales data processing method according to claim 13, wherein the setting contents indicate that the operation to receive the registration of a merchandise item is to be performed when the time length is less than a threshold, and that the operation to make a merchandise item correspond to the one of the plurality of input keys is to be performed when the time length is not less than the threshold.

15. The sales data processing method according to claim 9, wherein the first database stores identification information for the plurality of operators and the group attribute in association with each of the plurality of operators;
   wherein the method further comprises obtaining identification information corresponding the operator of the operation input device; and
   wherein the group attribute is obtained from the first database based on the obtained identification information.

16. The sales data processing method according to claim 9, wherein the operation input device comprises a touch panel.

* * * * *